(12) United States Patent
Modi et al.

(10) Patent No.: US 11,489,411 B2
(45) Date of Patent: Nov. 1, 2022

(54) MOTOR CONTROLLER ASSEMBLY WITH CONTAINMENT SYSTEM FOR CAPACITOR

(71) Applicant: Nidec Motor Corporation, St. Louis, MO (US)

(72) Inventors: Chetan O. Modi, Valley Park, MO (US); Steven R. Palmer, Highland, IL (US); Aashish Pendru, Chesterfield, MO (US); Jeffrey Scott Sherman, Creve Coeur, MO (US); Douglas D. Glenn, Highland, IL (US)

(73) Assignee: Nidec Motor Corporation, St. Louis, MO (US)

( * ) Notice: Subject to any disclaimer, the term of this patent is extended or adjusted under 35 U.S.C. 154(b) by 523 days.

(21) Appl. No.: 16/594,979

(22) Filed: Oct. 7, 2019

(65) Prior Publication Data
US 2021/0104939 A1 Apr. 8, 2021

(51) Int. Cl.
*H02K 11/00* (2016.01)
*H01G 9/12* (2006.01)
*H02K 5/10* (2006.01)
*H02K 5/22* (2006.01)
*H01G 9/145* (2006.01)
*H02K 11/30* (2016.01)

(52) U.S. Cl.
CPC ........... *H02K 11/0094* (2013.01); *H01G 9/12* (2013.01); *H01G 9/145* (2013.01); *H02K 5/10* (2013.01); *H02K 5/225* (2013.01); *H02K 11/30* (2016.01); *H02K 2205/09* (2013.01); *H02K 2211/03* (2013.01)

(58) Field of Classification Search
None
See application file for complete search history.

(56) References Cited

U.S. PATENT DOCUMENTS

| 10,498,201 | B2 * | 12/2019 | Fujii | H01G 9/12 |
| 2012/0127633 | A1 * | 5/2012 | Mori | H01G 9/145 |
| | | | | 423/625 |
| 2018/0006519 | A1 * | 1/2018 | Modi | H02K 5/225 |
| 2018/0183304 | A1 * | 6/2018 | Fujii | H02K 11/33 |
| 2020/0136468 | A1 * | 4/2020 | Stollmeyer | H05K 1/183 |
| 2021/0104939 | A1 * | 4/2021 | Modi | H02K 11/33 |

FOREIGN PATENT DOCUMENTS

WO WO-2010140618 A1 * 12/2010 ........... H01G 9/0003

* cited by examiner

*Primary Examiner* — Dion R. Ferguson
(74) *Attorney, Agent, or Firm* — Hovey Williams LLP

(57) ABSTRACT

A motor controller assembly is configured for use with an electric motor and includes a controller and an absorbent pad. The controller includes a capacitor with a capacitor shell and a liquid electrolyte contained therein. The capacitor shell has a frangible rupture area that opens during a capacitor rupture event to permit the discharge of liquid electrolyte from the capacitor shell. The absorbent pad overlies the rupture area to collect discharged liquid electrolyte.

17 Claims, 7 Drawing Sheets

MOTOR CONTROLLER ASSEMBLY WITH CONTAINMENT SYSTEM FOR CAPACITOR

BACKGROUND

1. Field

The present invention relates generally to motor controllers. In particular, embodiments of the present invention concern the use of an absorbent pad to absorb liquid electrolyte discharged from a ruptured capacitor of the controller.

2. Discussion of Prior Art

Electric motors and other electric devices commonly use circuitry with electrolytic capacitors. Electrolytic capacitors are well known and incorporate a liquid electrolyte material. In certain instances, an internal space within an electrolytic capacitor may become overpressurized, such that the capacitor can burst open. For this reason, capacitors are provided with a pressure relief vent that is designed to open in response to excessive internal pressure.

However, the use of an electrolytic capacitor with a pressure relief vent may have several disadvantages. Should liquid electrolyte be discharged from the vent, the electrolyte can be dispensed onto adjacent electrical components. Because the electrolyte is electrically conductive, any discharged electrolyte can provide an electrically conductive path. In certain instances, the electrolyte may inadvertently provide a ground fault path to adjacent metal components, such as a control housing.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a motor controller assembly that does not suffer from the problems and limitations of the prior art devices, including those set forth above.

A first aspect of the present invention concerns a motor controller assembly for an electric motor. The motor controller assembly broadly includes a controller and an absorbent pad. The controller includes a capacitor with a capacitor shell and a liquid electrolyte contained therein. The capacitor shell has a frangible rupture area that opens during a capacitor rupture event to permit the discharge of liquid electrolyte from the capacitor shell. The absorbent pad overlies the rupture area to collect discharged liquid electrolyte.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 1:
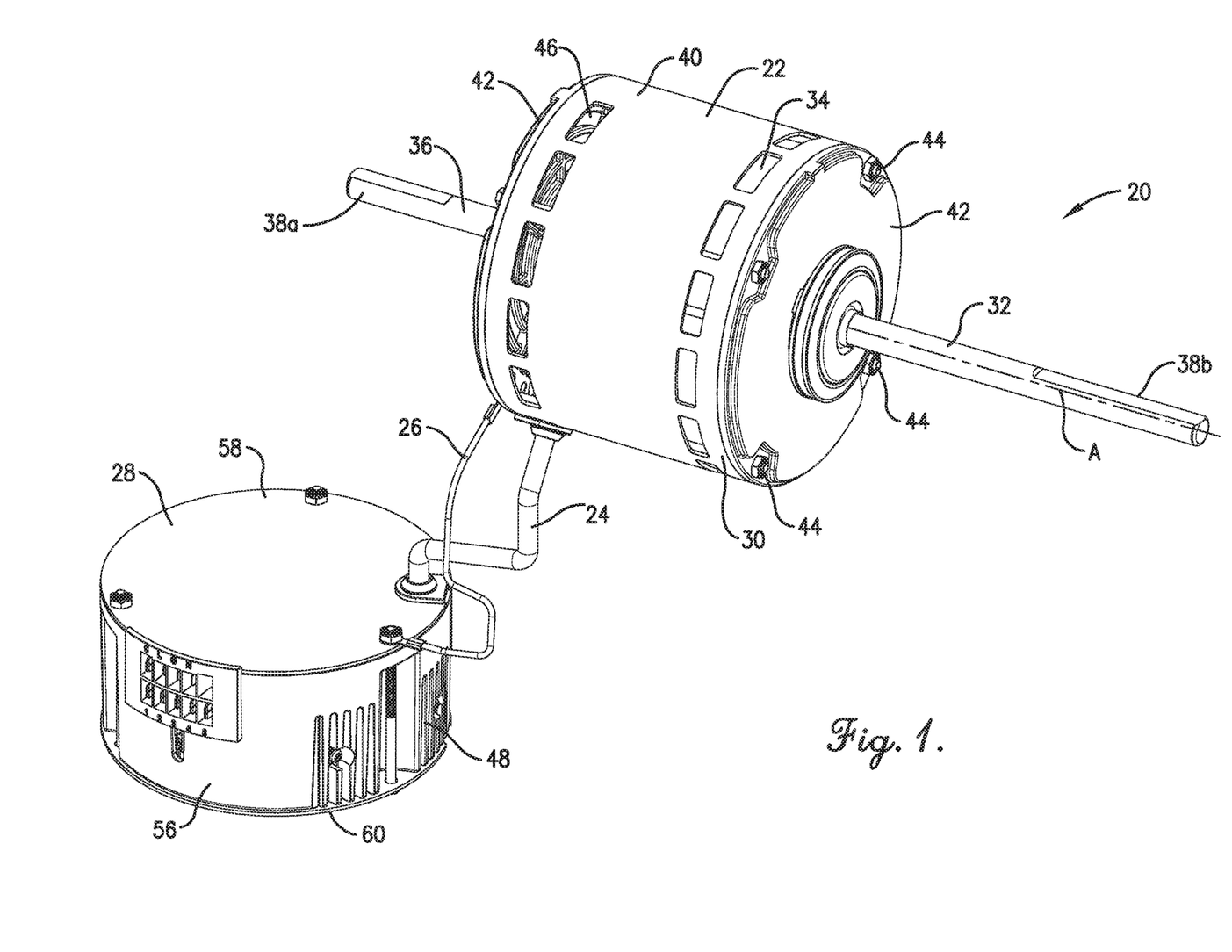
FIG. 1 is a perspective of an electric motor assembly constructed in accordance with a preferred embodiment of the present invention, showing an electric motor and a motor controller assembly operably coupled to the electric motor.
Figure 2:
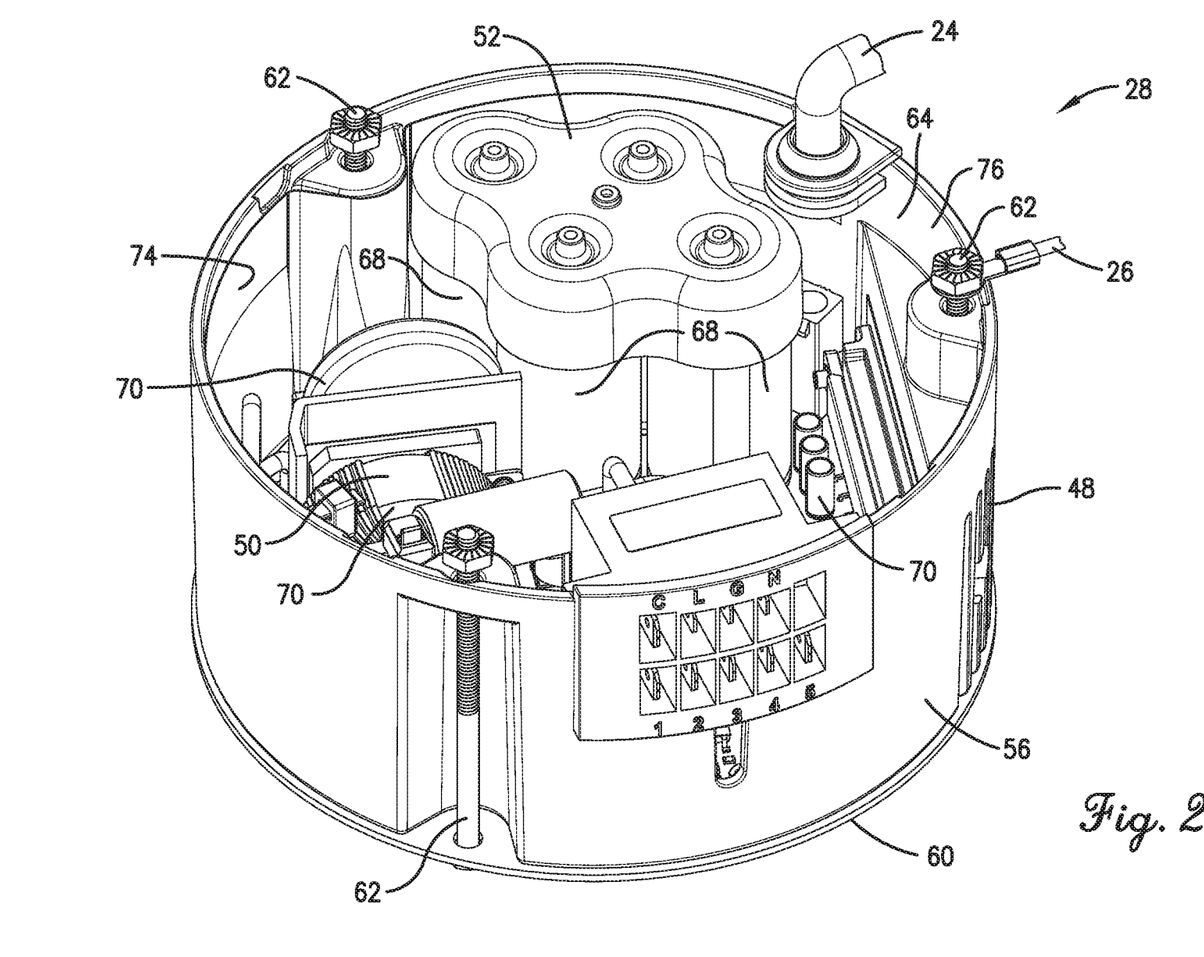
FIG. 2 is a perspective of the electric motor assembly shown in FIG. 1, with the motor controller assembly including a control housing, a controller, and a capacitor cover.
Figure 3:
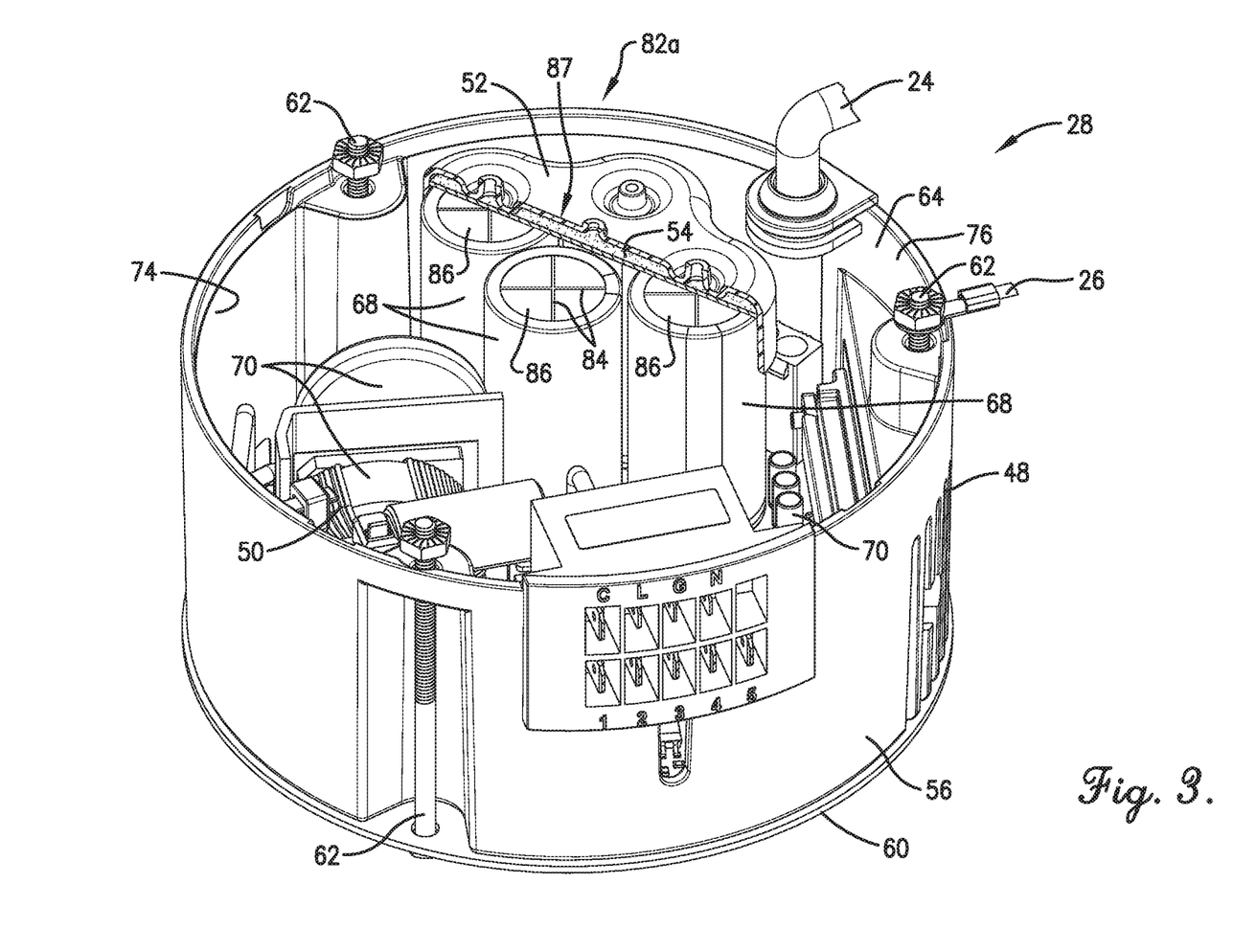
FIG. 3 is perspective of the electric motor assembly similar to FIG. 2, but showing the capacitor cover and an absorbent pad cross sectioned to more clearly show capacitors of the controller.

Turning to FIGS. 1 and 2, an electric motor assembly 20 is constructed in accordance with a preferred embodiment of the present invention. The electric motor assembly 20 is configured for service in a wide array of applications and environments. It will be understood that the electric motor assembly 20 can be drivingly attached to various mechanisms or machines within the scope of the present invention.

The electric motor assembly 20 broadly includes an electric motor 22, a wiring harness 24, a ground wire 26, and a motor controller assembly 28. The electric motor assembly 20 is preferably configured so that the electric motor 22 and the motor controller assembly 28 are spaced apart from one another when installed. For certain aspects of the present invention, the electric motor 22 and motor controller assembly 28 could be attached to one another or otherwise contact each other or be integrated with each other.

The electric motor 22 is configured for use in any suitable environment. The motor 22 broadly includes a motor housing 30, a rotor 32, and a stator 34 (see FIG. 1). The rotor 32 is preferably rotatable about a rotational shaft axis A. In preferred embodiments, the stator 34 at least substantially circumscribes the rotor 32, such that the motor 22 is an inner rotor motor. It is permissible according to some aspects of the present invention, however, for the motor to be an outer rotor motor.

In the usual manner, the rotor 32 preferably includes a shaft 36, a rotor core (not shown), and a plurality of magnets (not shown), The shaft 36 preferably includes opposite exposed portions 38*a,b* that are exposed relative to the motor housing 30 (see FIG. 1). It is also within the scope of the present invention for the shaft to be alternatively sized and/or located relative to the motor housing. For instance, the shaft could be configured so that only one end portion of the shaft is exposed relative to the motor housing (e.g., in alternative embodiments for which a control assembly is attached to an endshield opposite the exposed end portion).

The motor housing 30 preferably includes a shell 40, endshields 42, and fasteners 44. The shell 40 and the endshields 42 preferably present an internal motor chamber 46 that at least substantially receives the stator 34 and the rotor 32.

Turning to FIGS. 2-5, the illustrated motor controller assembly 28 is configured to provide adjustable operation of the electric motor 22. In cooperation with the motor controller assembly 28, the electric motor 22 could be configured to power a variety of devices without departing from the scope of the present invention. The motor controller assembly 28 preferably includes a control housing 48, a controller 50, a capacitor cover 52, and an absorbent pad 54. As explained below concerning the depicted embodiment, the capacitor cover 52 and absorbent pad 54 cooperatively provide a containment system capable of receiving any electrolyte discharged from one or more capacitors of the controller 50.

The control housing 48 is configured to contain the controller 50, capacitor cover 52, and the absorbent pad 54. The control housing 48 preferably includes a shell 56, upper and lower endplates 58,60, and fasteners 62 (see FIGS. 2-4). The shell 56 and the endplates 58 and 60 cooperatively present an internal control chamber 64 which receives the controller 50, capacitor cover 52, and the absorbent pad 54 (see FIG. 2).

In the depicted embodiment, the control housing 48 is spaced from the electric motor 22 and arranged so that the lower endplate 60 is underneath the shell 56. It is also within the scope of the present invention where the control housing 48 is alternatively positioned relative to the electric motor 22. Similarly, the control housing 48 could be alternatively oriented relative to the vertical direction within the scope of the present invention.

In alternative embodiments, the control housing could be attached directly to the electric motor. For particular aspects of the present invention, the electric motor assembly could be devoid of the control housing. For instance, the motor housing itself could be alternatively configured to at least partly contain the controller.

Figure 4:
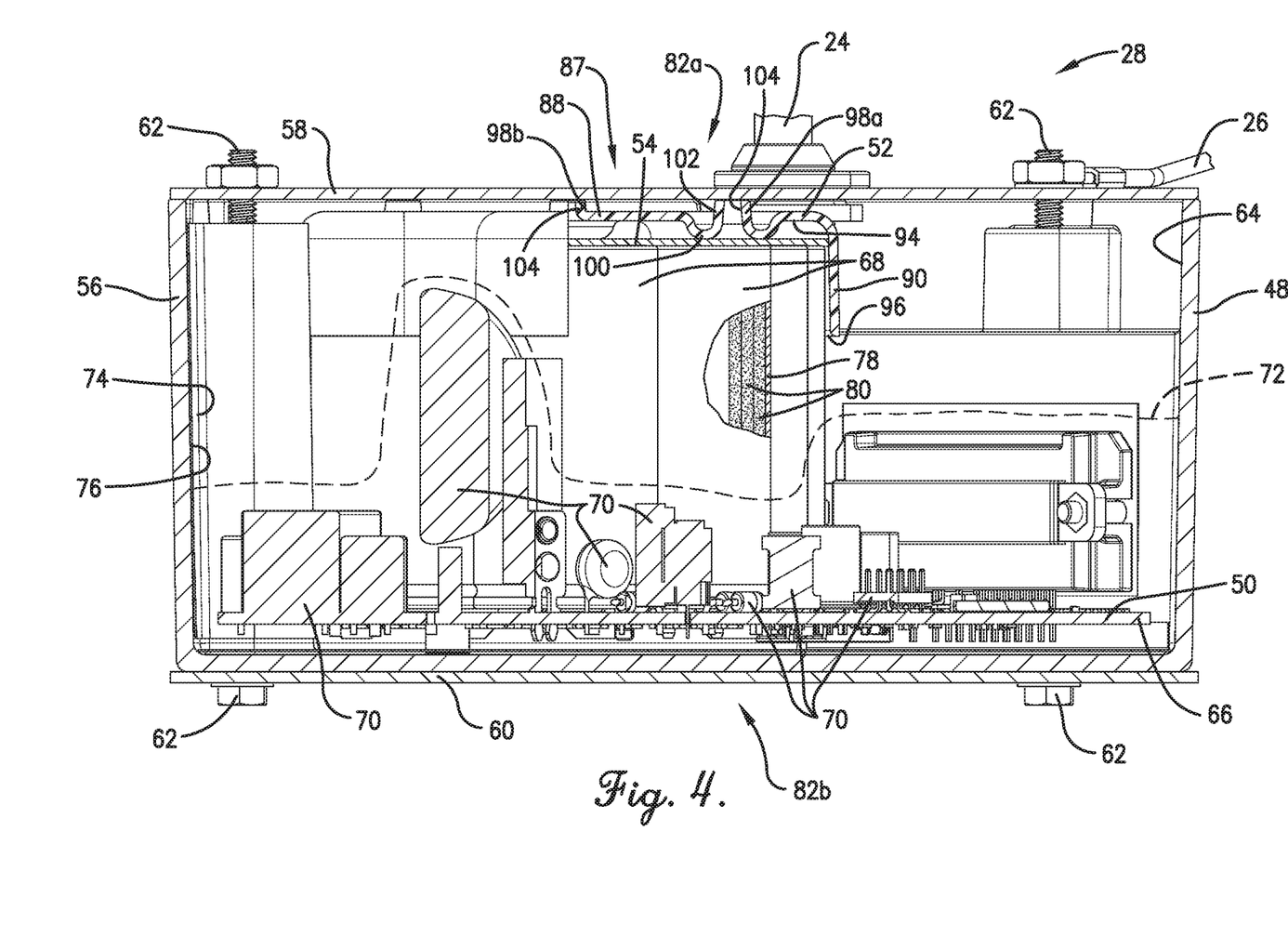
FIG. 4 is a cross section of the motor controller assembly shown in FIGS. 1-3, showing the capacitor cover and the absorbent pad located on the capacitors.

The illustrated controller 50 includes a control board 66, capacitors 68, and other electrical components 70 (see FIG. 4). The controller 50 is operably coupled to the electric motor 22 by the wiring harness 24 and the ground wire 26. The capacitors 68 and electrical components 70 are operably mounted on the control board 66.

In the depicted embodiment, the motor controller assembly 28 also includes a layer of potting material 72 and an insulation sheet 74 (see FIG. 4). Preferably, the potting material 72 includes a synthetic resin material and is applied within the control chamber 64 to cover and protect at least parts of the electrical components 70 and the capacitors 68.

The insulation sheet 74 serves to electrically insulate the shell 56 of the control housing 48 from the electrical components 70 and the capacitors 68. The insulation sheet 74 is positioned to extend along an inner surface 76 of the shell 56 (see FIG. 4). More particularly, the insulation sheet 74 preferably is located adjacent the capacitors 68 to restrict the shell 56 from contacting any liquid electrolyte that may be leaked from the capacitors 68. For some aspects of the present invention, the motor controller assembly could include one or more alternative insulating elements to insulate the shell from the electrical components and/or capacitors. For example, alternative embodiments of the motor controller assembly may include a conformal coating applied to one or more interior surfaces within the shell (e.g., applying the coating by brushing, spraying, and/or dipping onto the surface). Certain aspects of the present invention may contemplate the use of other types of insulation coatings or insulation layers, which may be applied to interior surfaces or otherwise positioned in the shell. It will be understood that various coatings may be applied to the circuit board, capacitors, electrical components, shell, and/or other components of the motor controller assembly.

Each capacitor 68 preferably comprises a conventional electrolytic capacitor. Among other things, the capacitor 68 includes a capacitor shell 78 and a liquid electrolyte material 80 contained within the capacitor shell 78 (see FIG. 4). The capacitor shell 78 presents a generally elongated and cylindrical shape and presents upper and lower capacitor ends 82*a,b* (see FIG. 4).

Although the capacitors are arranged in an upright configuration, one or more capacitors could be alternatively oriented within the scope of the present invention. For certain aspects of the present invention, it is permissible for one or more capacitors to be alternatively shaped.

Figure 5:
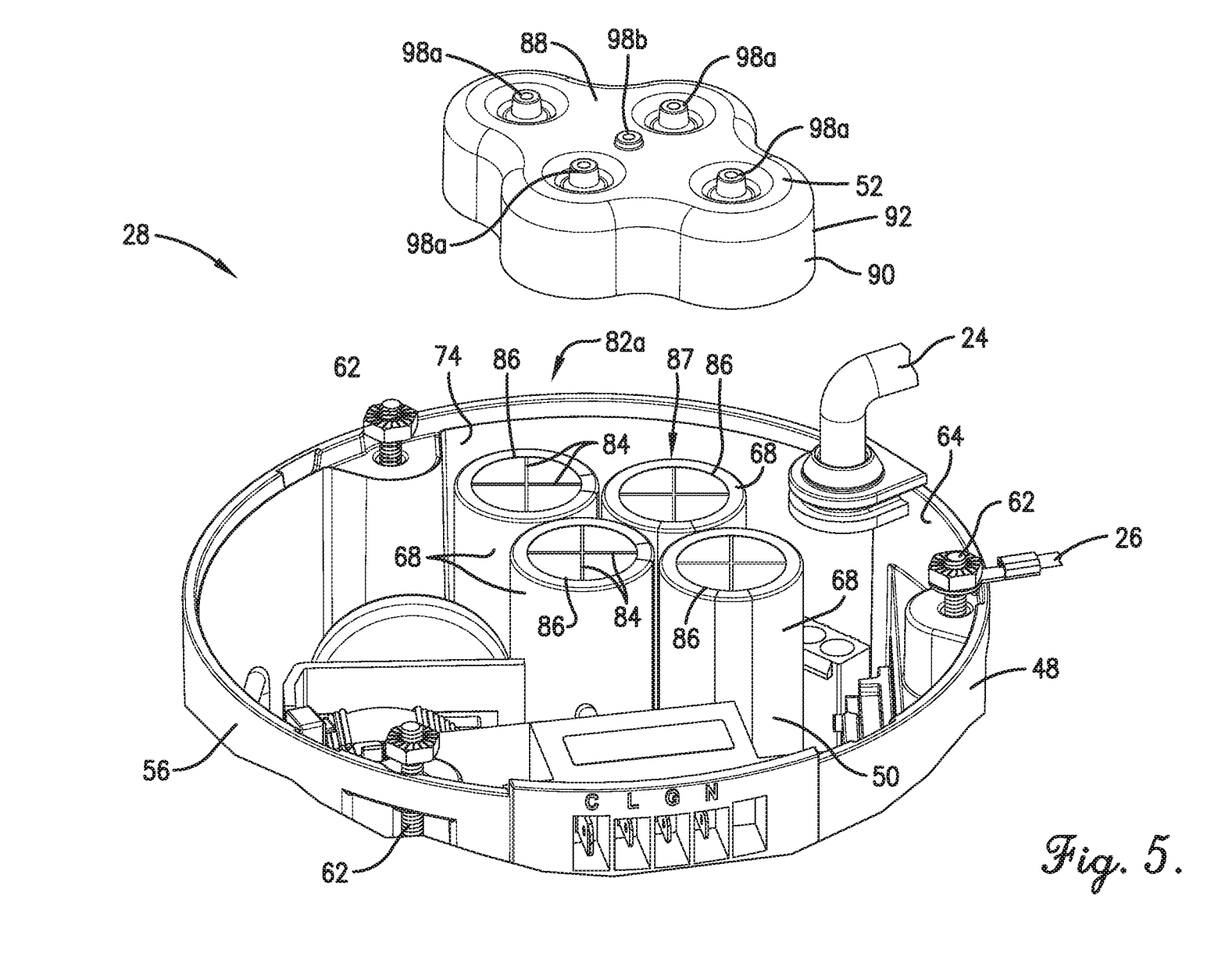
FIG. 5 is a perspective of the electric motor assembly similar to FIG. 2, but showing the capacitor cover and the absorbent pad removed from the capacitors.

Preferably, the upper capacitor ends 82*a* include lines of weakness in the form of a pair of intersecting score lines 84 (see FIG. 5). The score lines 84 are associated with a frangible rupture area 86 of the capacitor 68 (see FIG. 5). In the usual manner, the rupture area 86 provides a vent that opens in response to excessive pressure within the capacitor. Each rupture area 86 preferably comprises a generally circular area with a diameter sized to contain the score lines 84 (see FIG. 5). More preferably, the diameter of the rupture area 86 is generally defined by, and is coextensive with, the length of the score lines 84. For certain aspects of the present invention, the rupture area could extend laterally beyond at least one of the score lines. It is also within the ambit of the present invention for one or more of the rupture areas to be alternatively shaped and/or configured. For instance, the rupture area could be polygonal in shape (e.g., square, rectangular, octagonal, etc.).

The frangible rupture areas 86 of the capacitors 68 cooperatively present a potential rupture zone 87 (see FIG. 5). More specifically, the depicted rupture zone 87 includes an area bounded by the rupture areas 86 of the capacitors 68 (which includes the spaces between the capacitors 68). For certain aspects of the present invention, alternative rupture zone shapes are permissible. For instance, the capacitors could be configured so that no spacing is provided between the rupture areas. In alternative embodiments, the rupture zone could be defined by one or more alternatively-shaped capacitors, one or more alternatively-shaped rupture areas, and/or an alternative number of capacitors. Although the rupture areas are generally coplanar with one another, it will also be understood that one or more rupture areas are offset from one another in a direction normal to the plane of the rupture area, such that a three-dimensional rupture zone is formed.

The frangible rupture area 86 is configured to open along the score lines 84 during a capacitor rupture event to permit the discharge of liquid electrolyte 80 from the capacitor shell 78. The depicted arrangement of score lines 84 is preferred so that the frangible rupture area 86 opens when the internal pressure of the capacitor 68 exceeds a predetermined level. However, the frangible rupture area could have alternative score lines to provide a suitable pressure-relief mechanism. For certain aspects of the present invention, the capacitor could have another pressure-relief device (e.g., an alternative valve or vent structure) other than a frangible rupture area with score lines.

Although the depicted controller includes four (4) capacitors 68, the controller could have fewer capacitors (e.g., a single capacitor) or more than four (4) capacitors without departing from the scope of the present invention.

Turning to FIGS. 4-8, the capacitor cover 52 and absorbent pad 54 are preferably used with one another to cooperatively collect discharged liquid electrolyte 80. In the illustrated embodiment, the capacitor cover 52 and absorbent pad 54 cooperate with one another to provide a containment system configured to receive any electrolyte discharged from the capacitors 68.

The capacitor cover 52 is preferably supported relative to the controller 50 via the capacitors 68 and overlies at least the frangible rupture areas 86 of the capacitors 68. As will be explained, the capacitor cover 52 permits gas to escape during a capacitor rupture event.

Figures 6, 7:
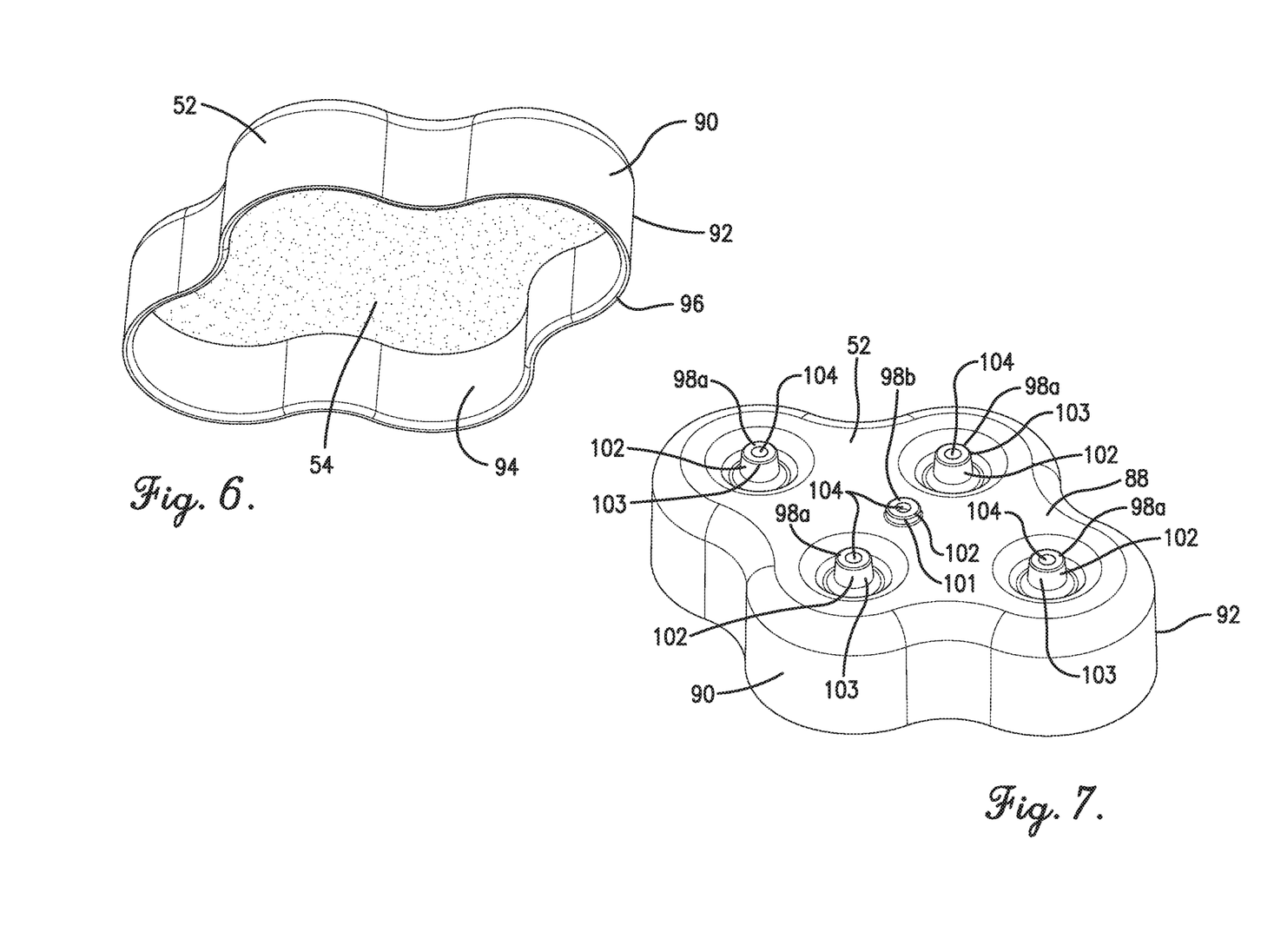
FIG. 6 is a lower perspective of the capacitor cover and the absorbent pad shown in FIGS. 3-5, depicting the absorbent pad removably received in a socket defined by the capacitor cover.
FIG. 7 is an upper perspective of the capacitor cover and the absorbent pad shown in FIGS. 3-6.
Figure 8:
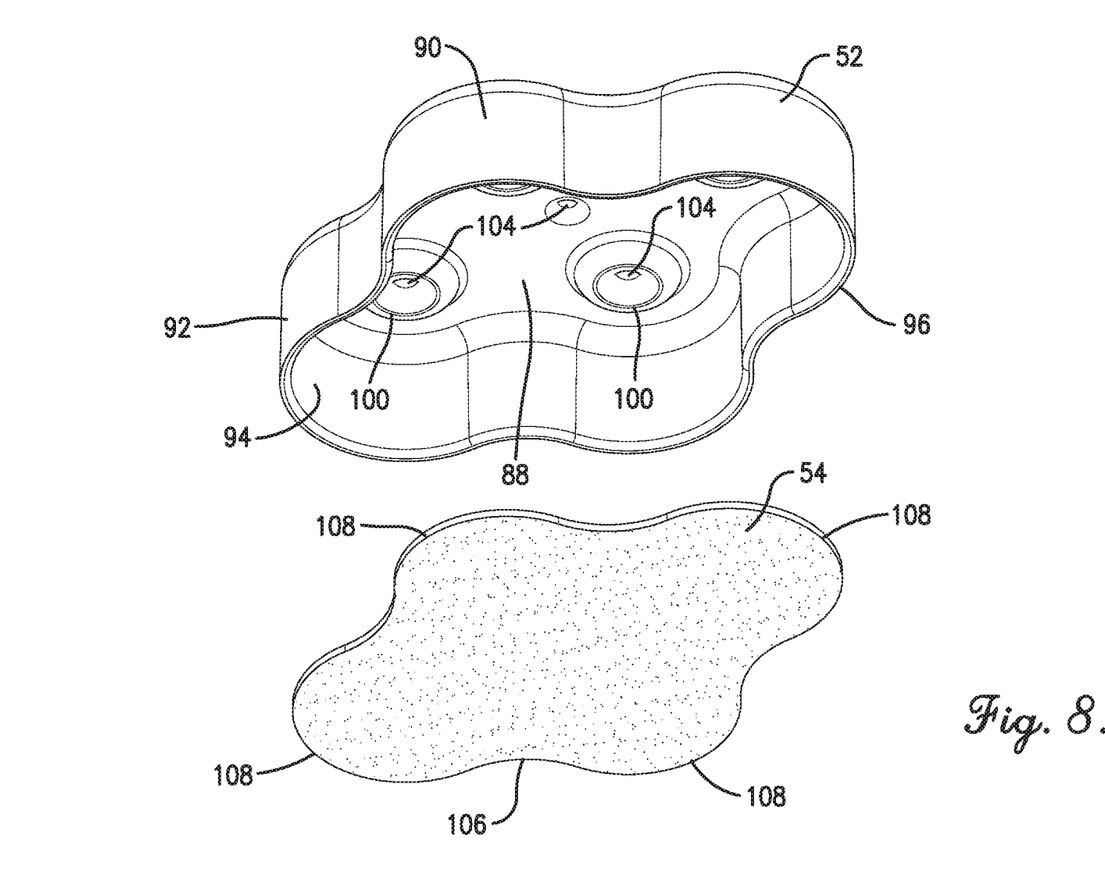
FIG. 8 is a lower exploded perspective of the capacitor cover and the absorbent pad shown in FIGS. 3-7.

In the depicted embodiment, the capacitor cover 52 preferably comprises a unitary structure including an endwall 88 and a perimetrical skirt 90 (see FIGS. 7 and 8). The skirt 90 extends continuously about the endwall 88 and is associated with an outer perimeter margin 92 of the capacitor cover 52. The endwall 88 and skirt 90 cooperatively present a socket 94 that receives at least part of the absorbent pad 54 and at least part of the capacitors 68.

The capacitor cover 52 also preferably presents an open face 96 through which the capacitors 68 can pass into and out of the socket 94 (see FIG. 4). The absorbent pad 54 preferably substantially spans the open face 96, as will be explained.

The illustrated endwall 88 includes vents 98a,b that are associated with positions of capacitors 68 when the capacitors 68 are located in the socket 94. Each vent 98a preferably includes a circular inner standoff 100. Each vent 98a also preferably includes an outer standoff 102 that provides a spacer 103 (see FIGS. 7 and 8). The vent 98b preferably includes an outer standoff 102 that provides a spacer 103 (see FIG. 7). Each vent 98 also preferably presents a vent opening 104 that extends through the inner standoff 100 and the outer standoff 102 and fluidly communicates with the socket 94 (see FIGS. 4, 7, and 8). Each vent opening 104 preferably allows gas to escape the socket 94, as will be explained.

The depicted vent openings 104 are centrally located relative to the respective inner and outer standoffs 100,102. However, the vent openings could be alternatively located relative to the inner and outer standoffs. For example, one or more vent openings could be laterally offset from the inner and outer standoffs (e.g., the vent openings could be spaced from the standoffs to extend through a planar wall section of the endwall). For certain aspects of the present invention, one or more vent openings could be at least partly provided by other parts of the capacitor cover (e.g., the skirt).

In the depicted embodiment, the vent openings 104 are each preferably configured to permit some gas and/or electrolyte to escape from a capacitor via the rupture area 86 during a capacitor rupture event. The vent openings 104 are also configured so that gas can escape from the socket 94 through the vent openings 104 during the capacitor rupture event. It will be appreciated that at least some gas may also be vented from the socket 94 by passing through the open face 96 (e.g., in openings formed between the capacitors or openings formed between the capacitors and the skirt). The capacitor cover 52 also preferably restricts the flow of liquid electrolyte 80 from one or more capacitors 68 during the capacitor rupture event. As will be explained, the capacitor cover 52 cooperates with the absorbent pad 54 to allow electrolyte 80 to be discharged from the capacitor via the rupture area 86 into the socket 94 while restricting electrolyte from advancing out of the socket 94. The capacitor cover 52 is positioned so that the capacitors 68 extend into and out of the socket 94. Thus, each of the illustrated capacitors 68 is preferably at least partly received by the capacitor cover 52. More specifically, the upper capacitor ends 82a are received within the socket 94 so that the capacitor cover 52 overlies the frangible rupture areas 86 of the capacitors 68.

Again, the capacitor cover 52 includes vents 98 that are associated with positions of capacitors 68. Preferably, the vents 98 are located so that the vent openings 104 at least partly overlie the frangible rupture areas 86 of the respective capacitors 68. In the depicted embodiment, the vent openings 104 are generally centered over respective frangible rupture areas 86. For certain aspects of the present invention, the vents 98 and vent openings 104 could be alternatively positioned relative to the capacitors 68.

In the depicted embodiment, the capacitor cover 52 is supported between the upper endplate 58 of the control housing 48 and the capacitors 68. The capacitor cover 52 is preferably located so that the outer standoffs 102 of the capacitor cover 52 contact the upper endplate 58. By way of this construction, the control housing 48 engages the capacitor cover 52 to maintain the capacitors 68 within the socket 94. For certain aspects of the present invention, at least some of the outer standoffs 102 could be immediately adjacent the upper endplate 58 without contacting the upper endplate 58. With the outer standoffs 102 contacting the upper endplate 58, the upper endplate 58 generally extends over the vent openings 104.

In the illustrated embodiment, the capacitor cover 52 is preferably molded into the disclosed unitary form. The capacitor cover 52 is preferably formed of a synthetic resin material, although the cover could be formed additionally or alternatively of other materials, without departing from the scope of certain aspects of the present invention.

In alternative embodiments, the capacitor cover may be provided with one or more walls within the socket (e.g., walls positioned to extend between adjacent capacitors and to separate the adjacent capacitors from each another). Similarly, the capacitor cover may have walls that cooperate with the skirt to form multiple discrete sockets associated with respective capacitors.

The depicted capacitor cover 52 is constructed to cover all four (4) of the capacitors 68. For certain aspects of the present invention, the capacitor cover may alternatively be configured to cover fewer capacitors (e.g., a single capacitor) or more than four (4) capacitors.

In alternative embodiments of the present invention, the controller may be provided with multiple capacitor covers rather than a single capacitor cover. For example, each capacitor could be associated with and covered by a corresponding capacitor cover.

For certain aspects of the present invention, the motor controller assembly may be devoid of the capacitor cover. Also, for some aspects of the present invention, the motor controller assembly may use an absorbent pad without the capacitor cover (e.g., where the absorbent pad alone is used to retain leaked electrolytic fluid from the capacitor).

The absorbent pad 54 preferably overlies the frangible rupture areas 86 to collect discharged liquid electrolyte 80 from the capacitors 68. More preferably, the absorbent pad 54 is at least coextensive with the frangible rupture zone 87. In the illustrated embodiment, the shape and dimension of the pad 54 (and the socket 94) correspond to that of the rupture zone 87.

The depicted absorbent pad 54 has a unitary construction and presents an outer margin 106 that defines rounded lobes 108 (see FIG. 8). The absorbent pad 54 also presents a generally uniform thickness. However, for certain aspects of the present invention, the absorbent pad 54 could be alternatively shaped. For instance, the absorbent pad 54 could be coextensive with each of the frangible rupture areas 86, while having at least part of the outer margin 106 spaced from the skirt 90.

It will also be appreciated that the absorbent pad could include multiple pad segments, each associated with a respective capacitor. In such alternative embodiments, each pad segment is preferably at least coextensive with the frangible rupture area of a respective capacitor (e.g., where each pad segment is circular and conforms to the frangible rupture area).

The absorbent pad 54 preferably includes a fibrous absorbent layer with cellulose fibers provided in the form of a matted felt layer that is permeable. More preferably, the absorbent pad 54 comprises a cellulose absorbent disk, Model EAD, provided by Permawick Company of Columbus, Ind. The material of the absorbent pad 54 is preferably liquid-absorbent and also fire-resistant.

However, for some aspects of the present invention, the absorbent pad could include an alternative material. For instance, the absorbent pad could include a fire-resistant aramid polymer or another fire-resistant synthetic resin material. For certain aspects of the present invention, the absorbent layer could be formed by molding a continuous layer of absorbent material (e.g., a synthetic resin material).

Preferably, the absorbent pad 54 can be removably located in the socket 94. The absorbent pad 54 is preferably positioned entirely in the socket 94 to receive discharged liquid electrolyte 80 within the socket 94. For some aspects of the present invention, the absorbent pad 54 could be only partly located within the socket. For instance, the absorbent pad could be offset from the socket and/or oversized relative to the socket so that part of the absorbent pad extends out of the socket.

In the depicted embodiment, the absorbent pad 54 preferably substantially spans the open face 96. In particular, the outer margin 106 of the absorbent pad 54 generally conforms to the shape of the skirt 90 so that the absorbent pad 54 is generally coextensive with the open face 96.

However, in alternative embodiments, the outer margin of the absorbent pad could be alternatively located relative to the skirt. As noted above, the absorbent pad could be offset from the socket and/or oversized relative to the socket. The absorbent pad could also be undersized relative to the socket so that at least part of the outer margin is located within the socket and spaced from the skirt. In alternative embodiments, it will also be understood that the absorbent pad could include multiple pad sections spaced within the skirt.

When located within the capacitor cover 52, the absorbent pad 54 extends along and contacts the inner standoffs 100. The absorbent pad 54 preferably overlies the vent openings 104. In at least some instances, particularly when the absorbent pad 54 is dry (or partly dry), the absorbent pad 54 is permeable and allows gas to escape from the socket 94 via the vent openings 104.

The absorbent pad 54 is preferably operable to receive discharged gas and/or liquid electrolyte 80 from a capacitor 68 during a rupture event. When a rupture event occurs, the capacitor cover 52 and absorbent pad 54 cooperatively permit gas and/or electrolyte to escape from the capacitor 68 via the rupture area 86 and into the socket 94. The absorbent pad 54 and capacitor cover 52 also cooperate to allow gas within the socket 94 to be discharged out of the socket 94 (primarily via the vent openings 104). At the same time, the capacitor cover 52 and absorbent pad 54 restrict electrolyte from advancing out of the socket 94. During a rupture event, gas from in or around the capacitor likely escapes before the absorbent pad 54 becomes fully soaked with liquid electrolyte. Gas is permitted to permeate dry or partly dry portions of the absorbent pad 54 and/or gas is permitted to pass through interstices defined between the absorbent pad and the capacitor cover (e.g., if the absorbent pad is fully soaked).

In the illustrated embodiment, the absorbent pad 54 and the capacitor cover 52 are discrete components that are assembled for positioning on the capacitors 68. Thus, the absorbent pad 54 can be selectively inserted into the socket 94 and removed from the socket 94.

However, for certain aspects of the present invention, the absorbent pad could be permanently attached to the capacitor cover. In various alternative embodiments, the absorbent pad could be adhered (or otherwise secured) within the capacitor cover. For instance, should an alternative absorbent pad comprise a moldable material, it will be appreciated that the absorbent pad could be molded, or otherwise formed, as part of the capacitor cover.

Again, the absorbent pad 54 preferably overlies the frangible rupture areas 86 to collect discharged liquid electrolyte 80 from the capacitors 68. In the depicted embodiment, the capacitor cover 52 supports the absorbent pad 54 adjacent the frangible rupture areas 86. The absorbent pad 54 is configured and positioned to be at least coextensive with each of the frangible rupture areas 86.

In use, the capacitor cover 52 and the absorbent pad 54 cooperatively permit gas to escape during a capacitor rupture event. The capacitor cover 52 and the absorbent pad 54 of the illustrated embodiment also cooperatively provide a containment system to receive discharged liquid electrolyte 80 from one or more of capacitors 68 and restrict liquid electrolyte 80 from being discharged from the socket 94. When a rupture event occurs, gas is permitted to permeate dry or partly dry portions of the absorbent pad 54 and/or gas is permitted to pass through interstices defined between the absorbent pad and the capacitor cover (e.g., if the absorbent pad is fully soaked). The vent openings 104 of the cover 52 allow gas to escape from the socket 94.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A motor controller assembly for an electric motor, said motor controller assembly comprising:
    a controller,
    said controller including a capacitor with a capacitor shell and a liquid electrolyte contained therein,
    said capacitor shell having a frangible rupture area that opens during a capacitor rupture event to permit the discharge of liquid electrolyte from the capacitor shell;
    an absorbent pad overlying the rupture area to collect discharged liquid electrolyte;
    a control housing,
    said controller and said absorbent pad being mounted within the control housing; and
    a capacitor cover supported between the control housing and the capacitor and overlying at least the rupture area,
    said capacitor cover presenting a socket receiving at least part of the absorbent pad and at least part of the capacitor,
    said capacitor cover engaging the control housing to maintain the capacitor received in the socket,
    said capacitor cover including an endwall defining at least in part the socket,
    said endwall including a spacer projecting in a direction generally opposite the socket,
    said spacer engaging the control housing.

2. The motor controller assembly as claimed in claim 1, said capacitor cover presenting a vent opening in communication with the socket to permit gas to escape from the socket through the vent opening during the capacitor rupture event.

3. The motor controller assembly as claimed in claim 2, said absorbent pad covering the vent opening.

4. The motor controller assembly as claimed in claim 1, said capacitor cover presenting an open face through which the capacitor extends into the socket,
said absorbent pad being substantially coextensive with the open face of the capacitor cover.

5. The motor controller assembly as claimed in claim 4, said capacitor cover including a perimetrical skirt depending from the endwall to define the open face.

6. The motor controller assembly as claimed in claim 1, said absorbent pad being supported by the capacitor cover adjacent the frangible rupture area.

7. The motor controller assembly as claimed in claim 6, said absorbent pad being at least coextensive with the frangible rupture area.

8. The motor controller assembly as claimed in claim 1, said capacitor being elongated and presenting an end that includes the frangible rupture area.

9. The motor controller assembly as claimed in claim 8, said socket presented by the capacitor cover receiving the end of the capacitor.

10. The motor controller assembly as claimed in claim 1, said controller including a plurality of capacitors arranged alongside one another, with each capacitor including the capacitor shell, the liquid electrolyte contained therein, and the frangible rupture area that opens during the capacitor rupture event.

11. The motor controller assembly as claimed in claim 10, said frangible rupture areas of the capacitors cooperatively presenting a potential rupture zone,
said absorbent pad being at least coextensive with the frangible rupture zone.

12. The motor controller assembly as claimed in claim 11, said socket presented by the capacitor cover receiving at least part of each capacitor.

13. The motor controller assembly as claimed in claim 1, said capacitor cover presenting a vent opening in communication with the socket to permit gas to escape from the socket through the vent opening during the capacitor rupture event,
said vent opening being defined in the spacer.

14. A motor controller assembly for an electric motor, said motor controller assembly comprising:
    a controller,
    said controller including a plurality of capacitors, with each capacitor having a capacitor shell and a liquid electrolyte contained therein,
    said capacitor shells each having a frangible rupture area that opens during a capacitor rupture event to permit the discharge of liquid electrolyte from the capacitor shell,
    said frangible rupture areas of the capacitors cooperatively presenting a rupture zone;
    a capacitor cover being supported relative to the controller and overlying the rupture zone; and
    an absorbent pad positioned within the capacitor cover to collect discharged liquid electrolyte.

15. The motor controller assembly as claimed in claim 14, said capacitor cover presenting a socket receiving at least part of the absorbent pad and at least part of each of the capacitors.

16. The motor controller assembly as claimed in claim 14, further comprising:
    a control housing,
    said controller and said absorbent pad being mounted within the control housing.

17. The motor controller assembly as claimed in claim 16, said capacitor cover supported between the control housing and the capacitors,
said capacitor cover presenting a socket receiving at least part of the absorbent pad and at least part of each of the capacitors,
said capacitor cover engaging the control housing to maintain the capacitors received in the socket.

* * * * *